United States Patent

Fujimoto et al.

[11] Patent Number: 6,066,684
[45] Date of Patent: May 23, 2000

[54] PHOTOPOLYMERIZABLE COMPOSITION AND OPTICAL DISK HAVING CURED COATING THEREOF

[75] Inventors: Juichi Fujimoto; Kouji Furukawa; Takashi Mita; Makoto Tokumizu, all of Nagoya, Japan

[73] Assignee: Mitsubishi Rayon Co., Ltd., Tokyo, Japan

[21] Appl. No.: 08/983,248

[22] PCT Filed: Apr. 8, 1996

[86] PCT No.: PCT/JP96/00962

§ 371 Date: Jan. 20, 1998

§ 102(e) Date: Jan. 20, 1998

[87] PCT Pub. No.: WO97/04033

PCT Pub. Date: Feb. 6, 1997

[30] Foreign Application Priority Data

Jul. 21, 1995 [JP] Japan ................................. 7-206749

[51] Int. Cl.⁷ ............................. C08K 5/42; C08K 5/098; B32B 3/00
[52] U.S. Cl. ......................... 522/79; 522/74; 522/182; 428/64.1; 428/64.4; 428/65.1; 524/165; 524/394; 524/796
[58] Field of Search ..................... 522/182, 120, 522/121, 141, 142, 74, 79, 82, 178, 184; 430/281.1, 286.1; 428/64.1, 64.4, 65.1; 524/165, 796, 394

[56] References Cited

U.S. PATENT DOCUMENTS 4,931,506  6/1990  Yu .
5,176,943  1/1993  Woo ............................................ 428/64
5,279,917  1/1994  Adachi et al. ........................... 430/157
5,604,005  2/1997  Endo et al. ............................. 428/64.3
5,609,990  3/1997  Ha et al. .................................. 430/271

FOREIGN PATENT DOCUMENTS 0368514   10/1989  European Pat. Off. .
63-6064    1/1988  Japan .
63-307947 12/1988  Japan .
63-314261 12/1988  Japan .
2-186598   7/1990  Japan .
4-18455    1/1992  Japan .
4-222874   8/1992  Japan .
4-247337   9/1992  Japan .

*Primary Examiner*—Susan W. Berman
*Attorney, Agent, or Firm*—Pillsbury Madison & Sutro LLP

[57] ABSTRACT

A photopolymerizable composition comprising (A) 100 parts by weight of a mixture of (meth)acrylic acid ester monomers, (B) from 0.1 to 5 parts by weight of a surfactant having a perfluoroalkyl group and represented by the general formula (1)

$$CF_3(CF_2)_nAM \qquad (1)$$

wherein A represents —$CO_2$— or —$SO_3$—, M represents an alkali metal, and n is an integer of 3 to 9, and (C) from 0.2 to 10 parts by weight of a photopolymerization initiator, and a plastic optical disk provided with a cured coating of the photopolymerizable composition on at least one side thereof.

8 Claims, No Drawings

PHOTOPOLYMERIZABLE COMPOSITION AND OPTICAL DISK HAVING CURED COATING THEREOF

This application is the national phase of international application PCT/JP96/00962 filed Apr. 8, 1996 which designated the U.S.

TECHNICAL FIELD

The present invention relates to a photopolymerizable composition and to an optical disk having a cured coating thereof. The present invention particularly relates to an antistatic hard coating composition, for an optical disk, which has a low curing shrinkage and a low viscosity.

BACKGROUND ART

Since molded articles prepared from a synthetic polymer molding material are usually significantly hydrophobic, they have a property that they tend to store a static electrical charge. The articles attract dust due to a static charge, and the static charge can cause electric shock, ignition, and the like. Consequently, the charging of the articles makes them difficult to use.

In order to prevent the charging of synthetic polymer material molded articles, it has heretofore been conducted to knead an electrically conducting agent such as carbon black and or a conductive metal powder, a surfactant, and the like into the polymer material, or to coat the molded articles with such antistatic agents. For example, Japanese Unexamined Patent Publication (Kokai) No. 63-307947 discloses a film coated with a charge-transfer complex. However, when resin molded articles, to which desired antistatic properties are imparted by using an electrically conducting agent such as a charge-transfer complex, is to be obtained, the amount of the conducting agent to be used becomes large, and other properties of the molded articles thus obtained tend to be deteriorated. Moreover, there is also a method of imparting antistatic properties to resin molded articles by adding a charge-transfer complex to an organic polymer. However, when the method is adopted, preparing molded articles having excellent transparency becomes difficult because the compatibility of the charge-transfer complex and the organic polymer is insufficient. Moreover, a large amount of an electrically conducting agent must be used to obtain a product having desired antistatic properties. Consequently, there arises the problem that the molded articles thus obtained have deteriorated properties.

In contrast to the electrically conducting agent, antistatic agents which are mainly surfactants have the advantages that many kinds of antistatic agents are known to exist, and that suitable ones can be selected so that their properties are in accordance with desired properties. Of these antistatic agents, internal addition type agents which are used by kneading them into a polymer material are disclosed in Japanese Unexamined Patent Publication (Kokai) No. 63-314261. Although such type antistatic agents have excellent antistatic properties, they have the disadvantage that satisfactory antistatic properties cannot be obtained when they are used by adding them to coating materials. On the other hand, a coating material of coating type which is applied to the surface of polymer material molded articles to impart antistatic properties thereto cannot impart sufficient antistatic effects in low humidity conditions. Moreover, the coating material may lose its antistatic effects during a drying step after the molded articles are coated therewith, during treatment such as heating, rubbing and cleaning at the time of subjecting the coated molded articles to drawing, thermosetting, shaping by heating or the like procedure, and the durability often becomes unsatisfactory.

As measures for solving such problems, Japanese Unexamined Patent Publication (Kokai) No. 63-6064 discloses the use of a coating material to which a phosphoric acid ester is added, and Japanese Unexamined Patent Publication (Kokai) No. 2-186598 proposes the use of a coating material to which a fluoro compound is added. However, even polymer material molded articles coated with a coating material containing these antistatic agents do not have well balanced mechanical strength of the coating thus formed, durability of the antistatic properties, and the like, when subjected to a long term durability test such as a humidity test.

Furthermore, a method of coating molded articles with an UV-curable coating material, and curing the coating material has been known. The method has the advantages that the substrate can be selected from a wide range of materials because the coating thus formed is excellent in adhesion to the substrate, and that the treatment time for forming the coating thereon is short. In addition to the advantages, the method has the advantage that the method can form a coating excellent in various coating properties such as chemical resistance, scuff resistance and abrasion resistance. However the coating has the problem that it generates a static charge due to friction, etc., and as a result dust tends to adhere thereto.

Furthermore, since the quantity of information processed in a computer, etc., has been increased in recent years, the memory capacity for recording signals in an optical disk has been increased, and the signal information density is very high. Consequently, the optical disk must be produced by molding with high precision. However, the conventional acrylic UV ray-curable coating material has the disadvantage that it suffers curing shrinkage during the formation of a coating layer and the disk warps. In order to overcome the problem of the curing shrinkage of the coating layer, investigation has been carried out into the reduction of the stress applied to the disk by decreasing the coating layer thickness, and the diminishing of the curing shrinkage by adding a polymer to the coating material. However, these procedures have disadvantages. For example, in the former procedure, control of the coating layer thickness is difficult, and the mechanical strength of the coating thus obtained becomes insufficient. On the other hand, in the latter procedure, the coating solution becomes highly viscous, and the adhesion of the coating is lowered. Consequently, it is difficult to obtain a desired performance of the coating layer. In view of the problems described above, the development of a coating material showing a decreased curing shrinkage, having a low viscosity and excellent in a balance between the antistatic properties and the adhesion of the coating is desired.

DISCLOSURE OF THE INVENTION

In the present invention, the present inventors have succeeded, by adding a surfactant having a perfluoroalkyl group to a UV ray-curable coating material, in obtaining a coating material which can form a coating showing no bleeding of the surfactant on the cured coating surface over a long period of time, and having excellent antistatic properties, and which is excellent in coating workability due to its low viscosity and storage stability, without impairing such various properties of coatings prepared from conventional UV ray-curable coating materials as excellent transparency, scuff resistance and solvent resistance.

Furthermore, the present invention can provide a coating material showing a decreased curing shrinkage during the formation of a coating.

The present invention provides a photopolymerizable composition comprising (A) 100 parts by weight of a mixture of (meth)acrylic acid ester monomers, (B) from 0.1 to 5 parts by weight of a surfactant having a perfluoroalkyl group and represented by the general formula (1)

$$CF_3(CF_2)_nAM \qquad (1)$$

wherein A represents $—CO_2—$ or $—SO_3—$, M represents an alkali metal, and n is an integer of 3 to 9, and (C) from 0.2 to 10 parts by weight of a photopolymerization initiator.

The present invention also provides a plastic optical disk provided with a cured coating of the abovementioned photopolymerizable composition on at least one side thereof.

BEST MODE FOR CARRYING OUT THE INVENTION

When the mixture of (meth)acrylic ester monomers (A) used in the present invention is subjected to a cross-linking reaction, it imparts a scuff resistance and surface-protecting effects of the substrate to the coating formed from the coating material of the present invention. The (meth)acrylic acid esters forming the monomer mixture (A) are compounds having at least one (meth)acryloyl group in the molecule. Examples of such compounds include:

(a) a compound having at least three (meth)acryloyl groups, (b) a compound having two (meth)acryloyl groups, (c) a compound having one (meth)acryloyl group and containing no hydroxyl group, and (d) a compound having one (meth)acryloyl group and at least one hydroxyl group.

A particularly preferred example of the mixture of (meth) acrylic acid ester monomers (A) is a mixture containing from 0 to 60% by weight of the compound (a), from 20 to 90% by weight of the compound (b), from 5 to 30% by weight of the compound (c) and from 1 to 20% by weight of the compound (d).

Examples of the compound (a) include trimethylolpropane tri(meth)acrylate, trimethylolethane tri(meth)acrylate, glycerin tri(meth)acrylate, pentaerythritol tri(meth)acrylate, di trimethylolpropane tetra(meth)acrylate, pentaerythritol tetra(meth)acrylate, dipentaaerythritol penta(meth)acrylate and dipentaaerythritol hex(meth)acrylate. These compounds may be used singly or in a mixture of at least two of them.

When the mixture of (meth)acrylic acid ester monomers (A) is a combination of the compounds (a) to (d), the amount of the compound (a) is preferred to be from 0 to 60% by weight. A coating obtained by using the photopolymerizable composition of the present invention containing up to 60% by weight of the compound (a) has excellent antistatic properties as well as good surface-protecting properties such as scuffing resistance. Moreover, the coating formed from the coating material shows a good surface orientation of the antistatic component, and has satisfactory antistatic properties.

Examples of the compound (b) include 1,3-butanediol di(meth)acrylate, 1,4-butanediol di(meth)acrylate, 1,6-hexanediol di(meth)acrylate, diethylene glycol di(meth) acrylate, polyethyleneglycol di(meth)acrylate, neopentyl glycol di(meth)acrylate, hydroxy pivalic acid neopentyl glycol di(meth)acrylate and a compound represented by the general formula (2)

$$CH_2=C(R^1)COO(R^2O)_nR^3O(R_2O)_mCOC(R^1)=CH_2 \qquad (2)$$

wherein $R^1$ represents $—H$ or $—CH_3$, $R^2$ represents an alkylene group of 2 to 3 carbon atoms, $R^3$ represents a bisphenol A residue, a hydrogenated bisphenol A residue, a bisphenol F residue or cyclohexanedimethanol residue, and m and n are each a positive integer provided that m+n is from 2 to 10. These compounds may be used singly or in a mixture of at least two of them. When the compound (b) contains, at least as a part of it, the compound represented by the general formula (2), the photopolymerizable composition thus obtained preferably shows a decreased curing shrinkage during coating formation.

Concrete examples of the compound represented by the general formula (2) include compounds of the general formulas (3) and (4)

$$Ac—R^4—O—CH_2—(C_6H_{10})—CH_2—O—R^4—Ac \qquad (3)$$

$$Ac—R^4—O—(C_6H_4)—C(CH_3)_2—(C_6H_4)—O—R^4—Ac \qquad (4)$$

wherein Ac represents a (meth)acryloyl group, and $R^4$ represents $—(CH_2)_o—$ or $—[CH_2CH(CH_3)O]_p—$ (wherein o and p are each a positive integer provided that o+p is from 4 to 10).

The amount of the compound (b) to be used is preferably from 20 to 90% by weight, more preferably from 30 to 70% by weight. When the amount is less than 20% by weight, the adhesion between the coating formed from the coating material thus obtained and the substrate tends to lower. When the amount exceeds 90% by weight, the curability of the coating material becomes insufficient, and the scuffing resistance of the hard coating tends to lower.

When the compound (b) contains a compound represented by the general formula (2), the amount of the compound represented by the general formula (2) is more preferably from 25 to 70% by weight based on the entire monomer mixture (A). Moreover, in this case, the amount of the compound (a) is preferably from 0 to 20% by weight based on the entire monomer mixture (A).

Examples of the compound (c) include 2-ethylhexyl (meth)acrylate, ethoxyethyl (meth)acrylate, tetrahydrofurfuryl (meth)acrylate, cresol ethoxy (meth)acrylate, isobornyl (meth)acrylate and N-methoxymethyl(meth)acrylamide. These compounds may be used singly or in a mixture of at least two of them.

The amount of the compound (c) to be used is preferably from 5 to 30% by weight. When the amount is less than 5% by weight, the adhesion between the substrate and the coating formed from the coating material thus obtained tends to fall. When the amount exceeds 30% by weight, the curability of the coating material thus obtained tends to fall.

Examples of the compound (d) include N-hydroxymethyl-(meth)acrylamide, 2-hydroxyethyl (meth)acrylate, 2-hydroxypropyl (meth)acrylate, 3-hydroxybutyl (meth)acrylate, 4-hydroxybutyl (meth)acrylate, 2-hydroxy pentyl (meth)acrylate, 4-hydroxy pentyl (meth)acrylate, and ethylene oxide or propylene oxide addition products of 2-hydroxyethyl (meth)acrylate and 2-hydroxypropyl (meth)acrylate. These compounds may be used singly or in a mixture of at least two of them.

The amount of the compound (d) to be used is preferably from 1 to 20% by weight, more preferably from 3 to 10% by weight. When the amount is less than 1% by weight, the long term storage stability of the coating formed from the coating material thus obtained tends to fall, and in particular the surfactant used tends to bleed. When the amount exceeds 20% by weight, the curability of the coating material thus obtained tends to fall.

Of the (meth)acrylic acid esters exemplified above as the compounds (a) to (d), the compounds each having an acryloyl group is particularly preferred, compared with the compounds each having a methacryloyl group, due to their curability.

The surfactant (B) represented by the general formula (1) and used in the present invention lowers the surface tension of the photopolymerizable composition of the present invention, and not only improves the coating performance of the composition used as a coating material but also imparts excellent antistatic effects to the coating formed from the coating material.

Examples of the surfactant (B) represented by the general formula (1) are lithium perfluorobutylsulfonate, potassium perfluorobutylsulfonate, sodium perfluorobutylsulfonate, lithium perfluorocapronate, potassium perfluorocapronate, sodium perfluorocapronate, lithium perfluorohexylsulfonate, potassium perfluorohexylsulfonate, sodium perfluorohexylsulfonate, lithium perfluoropelargonate, potassium perfluoropelargonate, sodium perfluoropelargonate, lithium perfluorooctylsulfonate, potassium perfluorooctylsulfonate, sodium perfluorooctylsulfonate, lithium perfluorocaprate, potassium perfluorocaprate, sodium perfluorocaprate, lithium perfluoropentanoate, potassium perfluoropentanoate, sodium perfluoropentanoate, lithium perflorononylsulfonate, lithium perfluoroundecylate, lithium perfluorononanoate and lithium perfluoroheptanoate. These compounds may be used singly or in a mixture of at least two of them.

Of the surfactants of the general formula (1), those compounds containing lithium as M are preferred because they have particularly excellent antistatic properties.

A coating obtained from the composition containing a compound of the general formula (1) may show unsatisfactory antistatic properties when n is less than 3, and may sometimes show unsatisfactory antistatic properties, poor compatibility with components forming the composition other than the compound and poor long term storage stability when n exceeds 9.

The amount of the surfactant (B) represented by the general formula (1) to be used is from 0.1 to 5 parts by weight, preferably from 0.3 to 3 parts by weight based on 100 parts by weight of the monomer mixture (A). When the amount is less than 0.1 part by weight, the antistatic properties of the coating thus obtained is not satisfactory. On the other hand, when the amount exceeds 5 parts by weight, the curability of the coating material prepared from the composition is deteriorated, and the surface hardness of hard coating thus obtained is lowered. Moreover, the surfactant used may bleed, and the long term storage stability tends to become poor.

In addition, the photopolymerizable composition of the present invention may contain, together with the surfactant (B) represented by the general formula (1), from 0.1 to 5 parts by weight of a surfactant having a perfluoroalkyl group represented by the general formula (5)

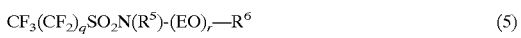

$$CF_3(CF_2)_q SO_2 N(R^5)\text{-}(EO)_r\text{---}R^6 \qquad (5)$$

wherein $R^5$ represents ---H, an alkyl group or benzyl group, $R^6$ represents ---H, ---COCH=CH$_2$ or ---COC(CH$_2$)=CH$_2$, q is an integer of 3 to 9, and r is an integer of 3 to 30, based on 100 parts by weight of the monomer mixture (A). The coating thus obtained shows further improved antistatic properties.

Examples of the photopolymerization initiator (C) used in the present invention include such carbonyl compounds showing absorption in the UV wavelength region of 260 to 450 nm as benzoin, benzoin methyl ether, benzoin ethyl ether, benzoin isopropyl ether, dibenzyl, benzophenone, p-methoxy-benzophenone, diethoxyacetophenone, methylphenyl glyoxylate, 4,4'-bis(dimethylamino) benzophenone, 2-hydroxy-2-methyl-1-phenylpropane-1-one, 1-hydroxycyclohexyl phenyl ketone, benzyl methyl ketal, 2,4-diethylthioxanthone, 2,4-diisopropylthioxanthone and 2,4,6-trimethylbenzoyldiphenyl-phosphine oxide. These compounds may be used singly or in a mixture of at least two of them.

The amount of the photopolymerization initiator (C) to be used is from 0.2 to 10 parts by weight, preferably from 2 to 8 parts by weight based on 100 parts by weight of the monomer mixture. When the amount to be used is less than 0.2 part by weight, the curability of the composition thus obtained is not sufficient. When the amount exceeds 10 parts by weight, the photopolymerization initiator acts as a plasticizer so that the cured coating does not have a sufficient hardness, and in addition, the composition may gel when it is stored for a long period of time.

Conventional additives such as a surface adjusting agent, an UV light absorber, an antioxidant and a shrinkage-reducing agent may suitably be incorporated into the photopolymerizable composition of the present invention so long as the additives do not impair the antistatic properties.

The photopolymerizable composition of the present invention is useful as a coating material which can be cured by UV rays. There is no specific limitation on the methods of coating and curing when the composition is used as a coating material. Examples of the source of generating UW rays used for curing include an ultrahigh pressure mercury lamp, a high pressure mercury lamp, a medium pressure mercury lamp, a low pressure mercury lamp, a metal halide lamp, a xenon lamp, a gallium lamp and sunlight.

The hard coating obtained by using the photopolymerizable composition of the present invention as a coating material has excellent scuff resistance and solvent resistance, compared with the coating obtained from a conventional UV ray-curable coating material, and shows durable antistatic properties.

The coating obtained by using the photopolymerizable composition of the present invention as a coating material has particularly excellent antistatic properties, and can impart good antistatic properties to molded articles prepared from an acrylic resin, a polycarbonate resin, etc. An optical disk having excellent antistatic properties and excellent scuff resistance can be obtained by providing a cured coating formed from the photopolymerizable composition of the present invention particularly on at least one side of a plastic optical disk, more particularly on at least one side of a polycarbonate optical disk.

The present invention will be illustrated further with reference to examples. In addition, "parts" in the examples signifies parts by weight. Moreover, the evaluation in the examples was made by the following methods.

Antistatic Properties

The antistatic properties were evaluated from the surface resistance and the static charge half life measured by the following methods. In Table 2 showing the measured results, the value shown in the upper row is the initial value subsequent to forming the coating, and the value shown in the lower row is a value subsequent to humidity test conducted by holding the coating at 80° C. at a relative humidity of 85% for 100 hours.

Surface Resistance: the surface resistance is measured for 1 minute using an Advantest TR-8601 type tester while a voltage of 100 V is applied.

Static Charge Half Life: the static charge half life is measured using a static paper analyzer (SP-428, manufactured by Kawaguchi Denshi K. K.) while a voltage of 8 kV is applied.

The antistatic properties are judged from the following criteria:

good (o): the surface resistance is less than $1\times10^{13}$ Ω and the static charge half life is less than 180 sec, and poor (x): the surface resistance is at least $1\times10^{13}$ Ω and the charging half life is at least 180 sec.

Surface Condition

The haze (%) of the coating subsequent to the Taber abrasion test under a load of 500 g is measured, and the value is shown in the upper row in Table 2. Moreover, the coating is subjected to a humidity test under the same conditions as mentioned above, and the appearance of the resultant coating is visually evaluated. The evaluated results are shown in the lower row in Table 2.

The surface condition is judged in accordance with the following criteria:

good (o): the haze is less than 10%, and there is no change in the appearance, and poor (x): the haze is at least 10%, and there is a change in the appearance.

Adhesion

The coating is subjected to an adhesive cellophane tape test in accordance with JIS K5400, and cells which remain without peeling are measured. The adhesion is expressed by the number of the remaining cells per 100 cells tested. The value in the upper row is the initial one, and that in the lower row is one subsequent to the same humidity test as mentioned above.

Storage Stability

The photopolymerizable composition is preserved in a constant-temperature water bath at 40° C. for a month, and then the condition of the composition is visually observed and evaluated.

Volumetric Shrinkage

A disk-like cured product having a diameter of 20 mm and a thickness of 5 mm is formed, and the volumetric shrinkage is determined from a difference between the liquid specific gravity of the photopolymerizable composition and the solid specific gravity of the cured product. The degree of the curing shrinkage is judged in accordance with the following criteria:

good (o): the volumetric shrinkage is less than 11%, and poor (x): the volumetric shrinkage is at least 11%.

Viscosity

The viscosity of the photopolymerizable composition is measured at 25° C. using an E type viscometer, and the viscosity is judged in accordance with the following criteria:

good (o): the viscosity is less than 60 cps, and poor (x): the viscosity is at least 60 cps.

Examples 1 to 14

COMPARATIVE EXAMPLES 1 TO 6

Into 100 parts by weight of a mixture of (meth)acrylic acid ester monomers (A) having a composition as shown in Tables 1-1 and 1-2 were incorporated a surfactant (B) and a photopolymerization initiator (or initiators) (C) in amounts (parts) as shown in the table, and uniformly mixed to give a photopolymerizable composition. Table 2 shows the storage stability and the viscosity of the photopolymerizable compositions thus obtained.

Next, one of the photopolymerizable compositions was used as a coating material, and a polycarbonate molded plate was coated therewith using a bar coater to form a coating having a dried thickness of 10 μm. The coating was irradiated with UV-rays to form a cured coating. The antistatic properties, the surface state and the adhesion of the coating were evaluated.

Furthermore, the volumetric shrinkage was measured by the procedure described above using a test piece (disk-like cured product) obtained from the photopolymerizable composition mentioned above.

Table 2 shows these results.

EXAMPLE 15

A photopolymerizable composition prepared in Example 1 was filtered through a membrane filter (0.2 μm). An optical disk substrate made of polycarbonate was coated therewith using a spin coater in an environment containing up to 1,000 floating particles/ft³ to form a coating having a dried thickness of 4 to 5 μm, and irradiated with UV-rays at an intensity of 1,000 mj/cm2 using a high pressure mercury lamp having a power consumption of 80 W/cm and placed 10 cm away from the optical disk to give an optical disk having a cured coating. The results of evaluating the antistatic properties, the surface state, the adhesion and the volumetric shrinkage of the coating were comparable to those in Example 1 shown in Table 2.

In addition, the abbreviations in the tables designate the following compounds.

DPHA: dipentaaerythritol hexaacrylate
DTMPTA: ditrimethylolpropane tetraacrylate
TMPTA: trimethylolpropane triacrylate
BPE-4: EO (4 moles)-added bisphenol A diacrylate
CHDE-4: EO (4 moles)-added 1,4-cyclohexanedimethanol diacrylate
TEGDA: tetraethylene glycol diacrylate
HDDA: 1,6-hexanediol diacrylate
THFA: tetrahydrofurfuryl acrylate
CEA: cresol ethoxyacrylate
HEA: 2-hydroxyethyl acrylate
HPA: 2-hydroxypropyl acrylate
HBA: 4-hydroxybutyl acrylate
HCP: 1-hydroxycyclohexyl phenyl ketone
BASCN: barium thiocyanate Table 1-1

TABLE 1-1

| | (A) | | | | | | | | | | | |
|---|---|---|---|---|---|---|---|---|---|---|---|---|
| | Compound (a) | | | Compound (b) | | | | Compound (c) | | Compound (d) | | |
| | DPHA | DTMPTA | TMPTA | BPE-4 | CHDE-4 | TEGDA | HDDA | THFA | CEA | HEA | HPA | HBA |
| Ex. 1 | 30 | | | | | 30 | 20 | 10 | | 10 | | |
| Ex. 2 | 15 | 10 | | | | 30 | 30 | 5 | 5 | | 5 | |
| Ex. 3 | | | 55 | | | 30 | 5 | 5 | | | 5 | |
| Ex. 4 | 30 | | | | | 30 | 20 | 10 | | 10 | | |
| Ex. 5 | 15 | 10 | | | | 30 | 30 | 5 | 5 | | 5 | |
| Ex. 6 | 30 | | | | | 30 | 20 | 10 | | 10 | | |
| Ex. 7 | 15 | 10 | | | | 30 | 30 | 5 | 5 | | 5 | |
| Ex. 8 | 9.5 | | 14 | 29 | | | 33 | 9.5 | | | 5 | |
| Ex. 9 | | | | 25 | 35.2 | | 32.4 | | | | 7.4 | |
| Ex. 10 | 22 | | 9.5 | | 42.8 | | 9.5 | 11.4 | | | | 4.8 |
| Ex. 11 | | | | 54.5 | | | 27.3 | 9.1 | | | | 9.1 |
| Ex. 12 | | | | 85.4 | | | | 11.7 | | | 2.9 | |
| Ex. 13 | 14.3 | | | 23.8 | 38.1 | | 9.5 | 9.5 | | | 4.8 | |
| Ex. 14 | 16.7 | | | 16.7 | 25 | | 12.5 | 12.5 | | | 16.6 | |
| CE. 1 | 30 | | | | | 30 | 20 | 10 | | 10 | | |
| CE. 2 | 15 | 10 | | | | 30 | 30 | 5 | 5 | | 5 | |
| CE. 3 | | | 55 | | | 30 | 5 | 5 | | | 5 | |
| CE. 4 | 30 | | | | | | | 40 | 20 | 10 | | |
| CE. 5 | 20 | | 50 | | | | 27 | | 2 | | 1 | |
| CE. 6 | | 10 | | | | 45 | 35 | 10 | | | 5 | |

TABLE 1-2

| | (B) | | | | | |
|---|---|---|---|---|---|---|
| | $C_4F_9SO_3Li$ | $C_4F_9SO_3K$ | $C_4F_9CO_2Na$ | $C_6F_{13}CO_2Li$ | $C_6F_{13}CO_2Na$ | $C_8F_{17}SO_3Li$ |
| Ex. 1 | 4.5 | | | | | |
| Ex. 2 | | 4.5 | | | | |
| Ex. 3 | | | 4.5 | | | |
| Ex. 4 | | | | 1.0 | | |
| Ex. 5 | | | | | 0.2 | |
| Ex. 6 | | | | | | 3.0 |
| Ex. 7 | | | | | | |
| Ex. 8 | | | | | | 1.0 |
| Ex. 9 | | | | | | 0.5 |
| Ex. 10 | | | | | | 0.3 |
| Ex. 11 | | | | | | 2.0 |
| Ex. 12 | | | | | | 0.5 |
| Ex. 13 | | | | | | 0.5 |
| Ex. 14 | | | | | | 5.0 |
| CE. 1 | | | | | | |
| CE. 2 | | | | | | |
| CE. 3 | | | | | | |
| CE. 4 | | | | | | |
| CE. 5 | | | | | | |
| CE. 6 | | | | | | |

| | (B) | | | | (C) | |
|---|---|---|---|---|---|---|
| | $C_8F_{17}SO_3Na$ | $C_3F_7SO_3K$ | $C_4F_9CO_2K$ | $C_3F_7SO_3K$ | HCP | MPG |
| Ex. 1 | | | | | 8 | |
| Ex. 2 | | | | | | 4 |
| Ex. 3 | | | | | | 6 |
| Ex. 4 | | | | | 8 | |
| Ex. 5 | | | | | | 4 |
| Ex. 6 | | | | | 8 | |
| Ex. 7 | 1.0 | | | | | 4 |
| Ex. 8 | | | | | | 5 |
| Ex. 9 | | | | | | 3 |
| Ex. 10 | | | | | | 8 |
| Ex. 11 | | | | | 2 | 4 |
| Ex. 12 | | | | | | 5 |
| Ex. 13 | | | | | 8 | |
| Ex. 14 | | | | | 4 | 6 |
| CE. 1 | | 1.0 | | | 8 | |
| CE. 2 | | | 0.01 | | | 4 |
| CE. 3 | | | 8.0 | | | 6 |
| CE. 4 | | | | 1.0 | 6 | |
| CE. 5 | | | 0.01 | | 6 | |
| CE. 6 | | | 8.0 | | 6 | |

TABLE 2

| | Antistatic properties | | | Surface condition | |
|---|---|---|---|---|---|
| | Surface resistance (Ω) | Half life (sec) | Judgement | upper row:haze (%) lower row:appearance | Judgement |
| Ex. 1 | $1.0 \times 10^{11}$ | 8.5 | ○ | 7.8 | ○ |
| | $1.4 \times 10^{11}$ | 9.8 | | no change | |
| Ex. 2 | $1.8 \times 10^{11}$ | 10.4 | ○ | 8.0 | ○ |
| | $2.4 \times 10^{11}$ | 10.8 | | no change | |
| Ex. 3 | $2.6 \times 10^{11}$ | 11.2 | ○ | 6.4 | ○ |
| | $2.8 \times 10^{11}$ | 11.6 | | no change | |
| Ex. 4 | $5.6 \times 10^{11}$ | 18.1 | ○ | 7.2 | ○ |
| | $5.8 \times 10^{11}$ | 19.0 | | no change | |
| Ex. 5 | $7.6 \times 10^{11}$ | 23.0 | ○ | 7.6 | ○ |
| | $8.4 \times 10^{11}$ | 24.5 | | no change | |
| Ex. 6 | $1.5 \times 10^{11}$ | 10.0 | ○ | 7.6 | ○ |
| | $2.0 \times 10^{11}$ | 10.2 | | no change | |
| Ex. 7 | $3.4 \times 10^{11}$ | 13.7 | ○ | 7.8 | ○ |
| | $3.8 \times 10^{11}$ | 14.3 | | no change | |
| Ex. 8 | $4.5 \times 10^{11}$ | 34.0 | ○ | 8.0 | ○ |
| | $6.7 \times 10^{11}$ | 55.0 | | no change | |
| Ex. 9 | $3.2 \times 10^{11}$ | 22.0 | ○ | 9.1 | ○ |
| | $3.6 \times 10^{11}$ | 28.0 | | no change | |
| Ex. 10 | $9.7 \times 10^{11}$ | 98.0 | ○ | 9.4 | ○ |
| | $1.4 \times 10^{12}$ | 122.0 | | no change | |
| Ex. 11 | $4.5 \times 10^{11}$ | 35.0 | ○ | 8.9 | ○ |
| | $5.0 \times 10^{11}$ | 44.0 | | no change | |
| Ex. 12 | $7.7 \times 10^{11}$ | 63.0 | ○ | 9.2 | ○ |
| | $7.9 \times 10^{11}$ | 74.0 | | no change | |
| Ex. 13 | $4.6 \times 10^{11}$ | 38.0 | ○ | 9.9 | ○ |
| | $5.1 \times 10^{11}$ | 45.0 | | no change | |
| Ex. 14 | $1.9 \times 10^{11}$ | 18.0 | ○ | 9.6 | ○ |
| | $2.1 \times 10^{11}$ | 25.0 | | no change | |
| CE. 1 | $4.7 \times 10^{13}$ | 140 | x | 7.3 | ○ |
| | $5.5 \times 10^{12}$ | 190 | | no change | |
| CE. 2 | $7.9 \times 10^{13}$ | >300 | x | 7.8 | ○ |
| | $1.2 \times 10^{14}$ | >300 | | no change | |
| CE. 3 | $7.8 \times 10^{10}$ | 5.6 | ○ | 6.9 | x |
| | $9.4 \times 10^{10}$ | 7.4 | | bleeding | |
| CE. 4 | $3.2 \times 10^{12}$ | 86 | ○ | 12.0 | x |
| | $5.0 \times 10^{12}$ | 150 | | no change | |

TABLE 2-continued

| | | | | Volumetric shrinkage | | Viscosity | |
|---|---|---|---|---|---|---|---|
| | Adhesion | Storage stability | | (%) | Judgement | Process-ability (cps) | |
| CE. 5 | | 4.3 × 10$^{13}$ | >300 | x | 11.8 | | x |
| | | 9.8 × 10$^{13}$ | >300 | | no change | | |
| CE. 6 | | 6.8 × 10$^{10}$ | 4.5 | ○ | 12.2 | | x |
| | | 7.5 × 10$^{10}$ | 5.0 | | bleeding | | |
| Ex. 1 | 100/100 | no change | | | | | |
| | 100/100 | | | | | | |
| Ex. 2 | 100/100 | no change | | | | | |
| | 100/100 | | | | | | |
| Ex. 3 | 100/100 | no change | | | | | |
| | 100/100 | | | | | | |
| Ex. 4 | 100/100 | no change | | | | | |
| | 100/100 | | | | | | |
| Ex. 5 | 100/100 | no change | | | | | |
| | 100/100 | | | | | | |
| Ex. 6 | 100/100 | no change | | | | | |
| | 100/100 | | | | | | |
| Ex. 7 | 100/100 | no change | | | | | |
| | 100/100 | | | | | | |
| Ex. 8 | 100/100 | no change | 10.0 | ○ | 30 | ○ | |
| | 100/100 | | | | | | |
| Ex. 9 | 100/100 | no change | 8.5 | ○ | 30 | ○ | |
| | 100/100 | | | | | | |
| Ex. 10 | 100/100 | no change | 10.5 | ○ | 40 | ○ | |
| | 100/100 | | | | | | |
| Ex. 11 | 100/100 | no change | 9.7 | ○ | 50 | ○ | |
| | 100/100 | | | | | | |
| Ex. 12 | 100/100 | no change | 7.4 | ○ | 40 | ○ | |
| | 100/100 | | | | | | |
| Ex. 13 | 100/100 | no change | 9.0 | ○ | 45 | ○ | |
| | 100/100 | | | | | | |
| Ex. 14 | 100/100 | no change | 9.3 | ○ | 35 | ○ | |
| | 100/100 | | | | | | |
| CE. 1 | 100/100 | no change | | | | | |
| | 100/100 | | | | | | |
| CE. 2 | 100/100 | no change | | | | | |
| | 100/100 | | | | | | |
| CE. 3 | 100/100 | hazy liquid | | | | | |
| | 100/100 | | | | | | |
| CE. 4 | 100/100 | no change | | | | | |
| | 100/100 | | | | | | |
| CE. 5 | 100/100 | no change | | | | | |
| | 100/100 | | | | | | |
| CE. 6 | 100/100 | hazy liquid | | | | | |
| | 100/100 | | | | | | |

INDUSTRIAL APPLICABILITY

The photopolymerizable composition of the present invention has a low viscosity, shows a decreased curing shrinkage at the time of coating and curing, and can form a cured coating excellent in scuff resistance, adhesion, durability and antistatic properties. The photopolymerizable composition is, therefore, extremely useful as a coating material for plastic molded articles and particularly for plastic optical disks.

What is claimed is:

1. A photopolymerizable composition comprising:
   (A) 100 parts by weight of a mixture of (meth)acrylic acid ester monomers, comprising:
   (a) from 0 to 60% by weight, based on the total weight of the mixture of (meth)acrylic acid ester monomers, of a compound having at least 3 (meth)acryloyl groups,
   (b) from 20 to 90% by weight, based on the total weight of the mixture of (meth)acrylic acid ester monomers, of a compound having two (meth)acryloyl groups,
   (c) from 5 to 30% by weight, based on the total weight of the mixture of (meth)acrylic acid ester monomers, of a compound having one (meth)acryloyl group and containing no hydroxyl group, and
   (d) from 1 to 20% by weight, based on the total weight of the mixture of (meth)acrylic acid ester monomers, of a compound having one (meth)acryloyl group and containing at least one hydroxyl group
   (B) from 0.1 to 5 parts by weight of a surfactant having a perfluoroalkyl group and represented by the general formula (1)

$$CF_3(CF_2)_nAM \qquad (1)$$

wherein A represents $-CO_2-$ or $-SO_3-$, M represents an alkali metal, and n is an integer of 3 to 9, and (C) from 0.2 to 10 parts by weight of a photopolymerization initiator.

2. The photopolymerizable composition according to claim 1, wherein the composition comprises from 0.3 to 3 parts by weight of the surfactant (B) represented by the general formula (1) and from 2 to 8 parts by weight of the photopolymerization initiator (C) per 100 parts by weight of the monomer mixture (A).

3. The photopolymerizable composition according to claim 1, wherein M in the surfactant (B) represented by the general formula (1) is lithium.

4. The photopolymerizable composition according to claim 1 wherein the amount of the compound (b) is from 30 to 70% by weight.

5. The photopolymerizable composition according to claim 1 wherein the amount of the compound (d) is from 3 to 10% by weight.

6. The photopolymerizable composition according to claim 1 wherein the amount of the compound (b) comprises a compound represented by the general formula (2)

$$CH_2=C(R^1)COO(R^2O)_nR^3O(R_2O)_mCOC(R^1)=CH_2 \qquad (2)$$

wherein $R^1$ represents $-H$ or $-CH_3$, $R^2$ represents an alkylene group of 2 to 3 carbon atoms, $R^3$ represents a bisphenol A residue, a hydrogenated bisphenol A residue, a bisphenol F residue or cyclohexanedimethanol residue, and m and n are each a positive integer provided that m+n is from 2 to 10.

7. The photopolymerizable composition according to claim 6, wherein the amount of the compound (a) is from 0 to 20% by weight.

8. The photopolymerizable composition according to claim 6, wherein the compound (b) contains from 25 to 70% by weight of the compound represented by the general formula (2).

* * * * *